US011256062B2

(12) United States Patent
Nakahara et al.

(10) Patent No.: US 11,256,062 B2
(45) Date of Patent: Feb. 22, 2022

(54) OPTICAL SYSTEM AND IMAGE PICKUP APPARATUS

(71) Applicant: CANON KABUSHIKI KAISHA, Tokyo (JP)

(72) Inventors: Makoto Nakahara, Utsunomiya (JP); Takeo Mori, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 152 days.

(21) Appl. No.: 16/590,671

(22) Filed: Oct. 2, 2019

(65) Prior Publication Data
US 2020/0110242 A1   Apr. 9, 2020

(30) Foreign Application Priority Data
Oct. 9, 2018   (JP) .............................. JP2018-191202

(51) Int. Cl.
*G02B 7/04*   (2021.01)
*G02B 7/02*   (2021.01)
*G02B 9/64*   (2006.01)

(52) U.S. Cl.
CPC .............. *G02B 7/04* (2013.01); *G02B 7/021* (2013.01); *G02B 9/64* (2013.01)

(58) Field of Classification Search
CPC ........... G02B 7/04; G02B 7/02; G02B 7/021; G02B 9/64; G02B 9/00
USPC ....................................................... 359/784
See application file for complete search history.

(56) References Cited

U.S. PATENT DOCUMENTS

| 10,079,964 B2* | 9/2018 | Matsumura ........ G02B 15/1461 |
| 10,274,709 B2* | 4/2019 | Noda ............. G02B 15/145113 |
| 10,295,801 B2* | 5/2019 | Noda ............. G02B 15/145113 |
| 10,620,398 B2* | 4/2020 | Kawamura .......... G02B 27/646 |
| 2014/0334014 A1 | 11/2014 | Matsui |
| 2016/0178875 A1* | 6/2016 | Matsumura ........ G02B 15/1461 359/684 |
| 2018/0059382 A1* | 3/2018 | Noda ..................... G02B 15/22 |
| 2018/0059384 A1* | 3/2018 | Noda ............. G02B 15/145113 |
| 2018/0164540 A1* | 6/2018 | Kawamura .......... G02B 15/143 |

FOREIGN PATENT DOCUMENTS

| CN | 104714293 A | 6/2015 |
| CN | 106873139 A | 6/2017 |
| CN | 107765397 A | 3/2018 |

(Continued)

*Primary Examiner* — William R Alexander
(74) *Attorney, Agent, or Firm* — Canon U.S.A., Inc. IP Division

(57) ABSTRACT

The optical system according to the present invention consists of a first lens unit with positive refractive power disposed closest to an object side, a middle group including at least two lens units, and a final lens unit with negative refractive power disposed closest to an image side in which intervals between adjacent lens units are changed during focusing. The middle group includes a first focus lens unit configured to move during focusing, and a second focus lens unit disposed on the image side of the first focus lens unit and configured to move during focusing. An aperture stop is disposed between two lenses included in the middle group. Here, a focal length of the optical system, a focal length of the final lens unit, and a focal length of a second focus lens unit are appropriately determined.

19 Claims, 11 Drawing Sheets

(56) References Cited

FOREIGN PATENT DOCUMENTS

| | | | |
|---|---|---|---|
| EP | 2942655 | A1 | 11/2015 |
| JP | 2015-034899 | A | 2/2015 |
| JP | 2017-116678 | A | 6/2017 |

* cited by examiner

OPTICAL SYSTEM AND IMAGE PICKUP APPARATUS

BACKGROUND OF THE INVENTION

Field of the Invention

The present invention relates to an optical system and an image pickup apparatus.

Description of the Related Art

There is a demand for compact image pickup optical systems having high optical performance over the entire object distance.

As a focusing method of relatively easily reducing a change of aberration during focusing, a floating method of moving a plurality of lens units independently during focusing is known.

U.S. Patent Application Publication No. 2018/0059384 discloses an optical system consists of five lens units in which intervals between adjacent lens units are changed during focusing, and the second lens unit and the fourth lens unit are moved during focusing.

In order to reduce changes in aberration during focusing, it is important to properly determine the refractive power of the focus lens unit disposed at the image side in the plurality of focus lens units and the refractive power of the final lens unit closest to the image side in the optical system in addition to simply adopting the floating method. For reducing a size of the optical system, it is important to properly determine the refractive power of the final lens unit.

In the optical system disclosed in U.S. Patent Application Publication No. 2018/0059384, the final lens unit has low refractive power and thus it is difficult to achieve high optical performance and downsize the optical system.

SUMMARY OF THE INVENTION

An optical system according to an example of the present invention includes a plurality of lens units in which intervals between adjacent lens units are changed during focusing. The plurality of lens units includes a first lens unit that has positive refractive power and is disposed closest to an object side, a middle group including at least two lens units, and a final lens unit that has negative refractive power and is disposed closest to an image side. The middle group includes a first focus lens unit configured to move during focusing, and a second focus lens unit disposed on an image side of the first focus lens unit and configured to move during focusing. The optical system satisfies following conditional expressions:

$$-7.00 < f/fn < -1.78$$

$$1.10 < |fr/fn| < 5.50$$

where f represents a focal length of the optical system, fn represents a focal length of the final lens unit, and fr represents a focal length of the second focus lens unit.

Further features of the present invention will become apparent from the following description of exemplary embodiments with reference to the attached drawings.

DESCRIPTION OF THE EMBODIMENTS

Figure 1A:
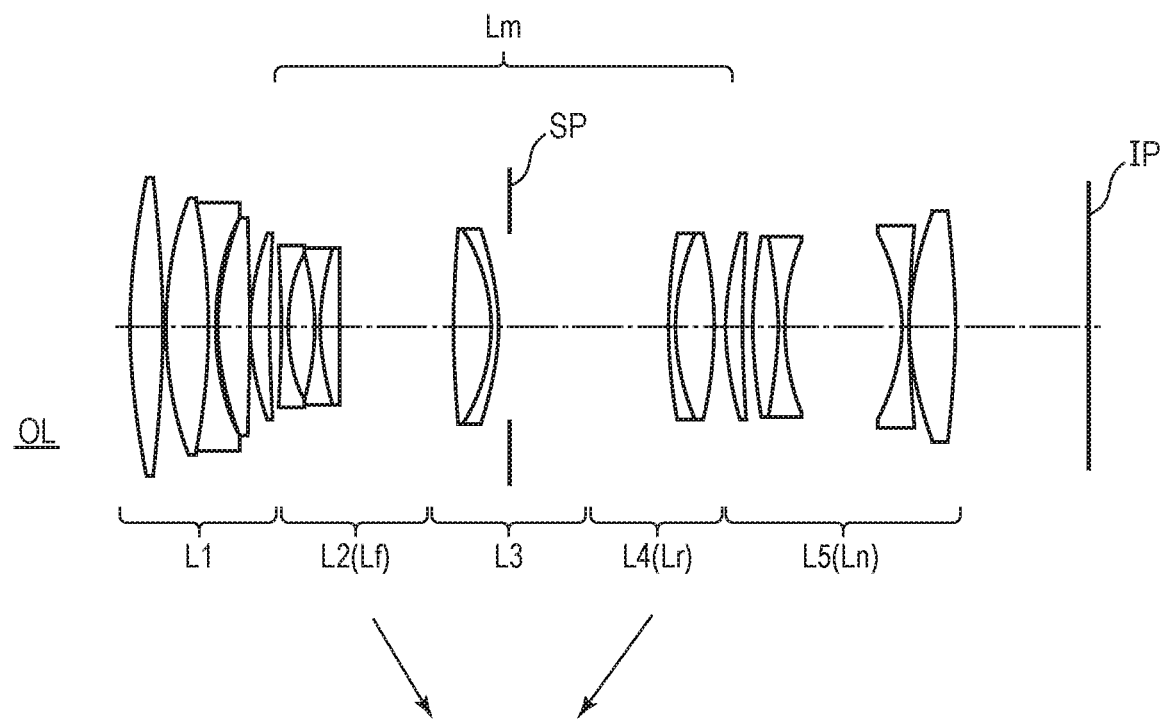
FIG. 1A is a sectional view of an optical system according to Example 1 during focusing on an object at infinity.

Preferred embodiments of the present invention will now be described in detail in accordance with the accompanying drawings.

An optical system and an image pickup apparatus according to examples of the present invention will be specifically described below with reference to the accompanying drawings.

[Examples of an Optical System]

The optical systems of the examples are image pickup optical systems used for image pickup apparatuses such as a digital still camera, a broadcast camera, a silver film camera, and a surveillance camera.

In the sectional views of the optical system illustrated in FIGS. 1A, 1B, 3A, 3B, 5A, 5B, 7A, 7B, 9A and 9B, the object side (front) is located on the left and the image side (rear) is located on the right. In the sectional views, Li indicates an i-th lens unit where i denotes the number of lens unit arranged from the object side toward the image side. An aperture stop SP determines (limits) the light flux of an open F number (Fno). During focusing from an object at infinity to an object at the closest distance, focus lens units move as indicated by arrows in the drawings.

When the optical systems of the examples are used for a digital video camera and a digital camera or the like, an image plane IP corresponds to an image pickup element (photoelectric conversion element), such as a CCD sensor or a CMOS sensor. When the optical systems of the examples are used for a silver film camera, the image plane IP corresponds to a film surface.

FIGS. 2A, 2B, 4A, 4B, 6A, 6B, 8A, 8B, 10A and 10B are aberration diagrams of the optical systems according to the examples. In the spherical aberration diagrams, Fno denotes an F number. In the spherical aberration diagram, a solid line indicates a d-line (a wavelength of 587.6 nm) and a chain double-dashed line indicates a g-line (a wavelength of 435.8 nm). In the astigmatism diagram, a broken line M indicates a meridional image plane and a solid line S indicates a sagittal image plane. A distortion indicates that of the d-line. A lateral chromatic aberration indicates that of the g-line. $\omega$ denotes a half angle of view (degree).

In the present specification, "lens unit" may consist of a plurality of lenses or a single lens. "Back focus" is an air-equivalent distance from the final surface to the paraxial image plane of the optical system on an optical axis. "Total lens length" is determined by adding a back focus to a distance from the front surface to the final surface of the optical system on the optical axis. An Abbe number vd of a certain material is expressed as vd=(Nd−1)/(NF−NC) where Ng, NF, Nd and NC are the refractive indexes of the material with respect to the g-line (a wavelength of 435.8 nm), the F-line (486.1 nm), the d-line (587.6 nm), and the C-line (656.3 nm), respectively.

The optical systems according to the examples of the present invention each include a plurality of lens units in which intervals between adjacent lens units are changed during focusing. The plurality of lens units include a first lens unit that has positive refractive power and is disposed closest to the object side, a middle group including at least two lens units, and a final lens unit that has negative refractive power and is disposed closest to the image side. The middle group includes a first focus lens unit and a second focus lens unit that is disposed on the image side of the first focus lens unit both of which move during focusing. By employing a floating method using at least two focus lens units, changes in aberration during focusing can be reduced.

Furthermore, the optical systems according to the examples of the present invention satisfy the following conditional expressions (1) and (2).

$$-7.00 < f/fn < -1.78 \quad (1)$$

$$1.10 < |fr/fn| < 5.50 \quad (2)$$

Here, f denotes a focal length of the optical system, fn denotes a focal length of the final lens unit and fr denotes a focal length of the second focus lens unit.

The conditional expressions (1) and (2) are conditions for downsizing the optical system and achieving high optical performance over entire object distance by suppressing changes in aberration during focusing.

The conditional expressions (1) and (2) will be described below.

The conditional expression (1) is a conditional expression of a focal length of the final lens unit. The final lens unit is set so as to have relatively high refractive power, thereby reducing a back focus and facilitating size reduction of the optical system.

If the ratio falls below the lower limit value in the conditional expression (1), the focal length of the final lens unit becomes shortened and the refractive power of the final lens unit becomes increased. Thus, it is difficult to correct various aberrations such as a field curvature and a distortion generated by the final lens unit, so that it is not preferable. If the ratio exceeds the upper limit value in the conditional expression (1), the focal length of the final lens unit becomes increased and the refractive power of the final lens unit becomes decreased. Thus, the back focus becomes increased and lead to difficulty in downsizing the optical system, so that it is not preferable.

The conditional expression (2) is related to the ratio of the focal length of the final lens unit and the focal length of the second focus lens unit. The second focus lens unit is set to have refractive power properly lower than that of the final lens unit. This reduces the size of the optical system and suppresses changes in aberration during focusing.

If the ratio falls below the lower limit value in the conditional expression (2) to decrease the focal length of the second focus lens unit and increase the refractive power of the second focus lens unit, changes in aberration becomes increased during focusing, thus it is not preferable. If the ratio exceeds the upper limit value in the conditional expression (2) to increase the focal length of the second focus lens unit and to decrease the refractive power of the second focus lens unit, a moving amount becomes increased during focusing from an object at infinity to an object at the closest distance. This leads to difficulty in downsizing the optical system, thus it is not preferable.

As above, the optical system satisfies the above-described configurations and the conditional expressions (1) and (2) at the same time, thereby the optical system with a small size and high optical performance over entire object distance from an infinity to a closest distance can be obtained.

Preferably, the numerical ranges of the conditional expressions (1) and (2) may be set as follows:

$$-6.50 < f/fn < -1.79 \quad (1a)$$

$$1.15 < |fr/fn| < 4.00 \quad (2a).$$

More preferably, the numerical ranges of the conditional expressions (1a) and (2a) may be set as follows:

$$-4.00 < f/fn < -1.79 \quad (1b)$$

$$1.20 < |fr/fn| < 3.50 \quad (2b).$$

Moreover, the optical system according to the example is preferable to satisfy at least one of the following conditional expression (3) to (9). By satisfying at least one of the conditional expressions (3) to (9), the effects of a size reduction of the optical system and a suppression of changes in aberration during focusing becomes enhanced and imaging (macro imaging) at a high imaging magnification becomes facilitated.

$$2.50 < f/sk < 9.00 \quad (3)$$

$$1.00 < f/f1 < 4.00 \quad (4)$$

$$1.50 < f/|f2| < 6.00 \quad (5)$$

$$10 < vd2p < 23 \quad (6)$$

$$0.02 < |D2|/DL < 0.40 \quad (7)$$

$$0.02 < |Dr|/DL < 0.40 \quad (8)$$

$$0.50 \leq (-\beta) \quad (9)$$

Here, "sk" denotes a back focus of the optical system during focusing on an object at infinity, f1 denotes a focal length of the first lens unit, and f2 denotes a focal length of the second lens unit. In this case, the second lens unit is a lens unit that is disposed closest to the object side in the middle group and has positive or negative refractive power. The second lens unit corresponds to the first focus lens unit. The Abbe number with respect to the d-line of the material of a positive lens included in the second lens unit is denoted as vd2p.

DL denotes the total lens length of the optical system during focusing on an object at infinity. D2 denotes a moving amount of the second lens unit during focusing from an object at infinity to an object at the closest distance when the second lens unit serves as the first focus lens unit, and Dr denotes a moving amount of the second focus lens unit during focusing from an object at infinity to an object at the closest distance. In this case, the signs of the moving amount D2 and the moving amount Dr become positive when the position of focusing on the object at the closest distance is closer to object side than the position of focusing on the object at infinity. The signs become negative when the position of focusing on the object at the closest distance is closer to the image side than the position of focusing on the object at infinity.

Moreover, β denotes an imaging magnification of the optical system during focusing on the object at the closest distance.

The conditional expressions (3) to (9) will be described below.

The conditional expression (3) is a conditional expression related to the back focus of the optical system. If the ratio falls below the lower limit value in the conditional expression (3) to increase the back focus, it becomes difficult to downsize the optical system, thus it is not preferable. If the ratio exceeds the upper limit value in the conditional expression (3) to decrease the back focus of the optical system, the outer diameter of the lens closest to the image side becomes increased, thereby the size of the optical system becomes increased in a radial direction, thus it is not preferable.

The conditional expression (4) is a conditional expression related to the focal length of the first lens unit. If the ratio falls below the lower limit value in the conditional expression (4) to increase the focal length of the first lens unit and decrease the refractive power of the first lens unit, the total lens length of the optical system becomes increased and leads to difficulty in downsizing, thus it is not preferable. If the ratio exceeds the upper limit value in the conditional expression (4) to decrease the focal length of the first lens unit and increase the refractive power of the first lens unit, various aberrations such as a spherical aberration occur, thus it is not preferable.

The conditional expressions (5) to (7) are related to the second lens unit disposed closest to the object side in the middle group and corresponding to the first focus lens unit that moves during focusing.

The conditional expression (5) is a conditional expression related to the focal length of the second lens unit. If the ratio falls below the lower limit value in the conditional expression (5) to increase the focal length of the second lens unit and decrease the refractive power of the second lens unit, the moving amount of the second lens unit becomes increased during focusing from an object at infinity to an object at the closest distance. This leads to difficulty in downsizing the optical system, thus it is not preferable. If the ratio exceeds the upper limit value in the conditional expression (5) to decrease the focal length of the second lens unit and increase the refractive power of the second lens unit, changes in aberration during focusing becomes increased, thus it is not preferable.

The conditional expression (6) is a conditional expression related to the Abbe number with respect to the d-line of the material of the positive lens included in the second lens unit. If the value falls below the lower limit value in the conditional expression (6), it becomes difficult to obtain a material satisfying the condition, thus it is not preferable. If the value exceeds the upper limit value in the conditional expression (6), unfortunately, it becomes difficult to suppress changes in chromatic aberration during focusing, thus it is not preferable.

The conditional expression (7) properly sets a moving amount of the second lens unit during focusing from an object at infinity to an object at the closest distance. If the ratio falls below the lower limit value in the conditional expression (7) to decrease the moving amount of the second lens unit, the refractive power of the second lens unit becomes increased to obtain a predetermined imaging magnification, leading to difficulty in suppressing changes in aberration generated during focusing, thus it is not preferable. If the ratio exceeds the upper limit value in the conditional expression (7) to increase the moving amount of the second lens unit during focusing, the total lens length of the optical system becomes increased and leads to difficulty in downsizing, thus it is not preferable.

The conditional expression (8) is related to the moving amount of the second focus lens unit during focusing from an object at infinity to an object at the closest distance. If the ratio falls below the lower limit value in the conditional expression (8) to decrease the moving amount of the second focus lens unit, the refractive power of the second focus lens unit becomes increased to obtain the predetermined imaging magnification, leading to difficulty in suppressing changes in aberration during focusing, thus it is not preferable. If the ratio exceeds the upper limit value in the conditional expression (8) to increase the moving amount of the second focus lens unit, the total lens length of the optical system becomes increased and leads to difficulty in downsizing, thus it is not preferable.

The conditional expression (9) is a conditional expression related to the imaging magnification of the optical system. If the value falls below the lower limit value in the conditional expression (9), it becomes difficult to sufficiently obtain the imaging effect of a macro lens, thus it is not preferable.

Preferably, the numerical ranges of the conditional expressions (3) to (9) may be set as follows:

$$3.50 < f/sk < 7.0 \quad (3a)$$

$$1.30 < f/f1 < 3.50 \quad (4a)$$

$$1.80 < f/|f2| < 5.00 \quad (5a)$$

$$10 < vd2p < 21 \quad (6a)$$

$$0.05 < |D2|/DL < 0.30 \quad (7a)$$

$$0.05 < |Dr|/DL < 0.35 \quad (8a)$$

$$0.60 \leq (-\beta) \quad (9a).$$

More preferably, the numerical ranges of the conditional expressions (3a) to (9a) may be set as follows:

$$4.00 < f/sk < 7.0 \quad (3b)$$

$$1.45 < f/f1 < 3.00 \quad (4b)$$

$$2.00 < f/|f2| < 4.50 \quad (5b)$$

$$10 < vd2p < 20 \quad (6b)$$

$$0.09 < |D2|/DL < 0.27 \quad (7b)$$

$$0.10 < |Dr|/DL < 0.30 \quad (8b)$$

$$0.70 \leq (-\beta) \quad (9b).$$

It is preferable that at least one of the first focus lens unit and the second focus lens unit consists of at most three lenses. This can easily reduce the weight of the focus lens unit, achieving high-speed focusing.

The optical system according to the example of the present invention includes an aperture stop disposed in the middle group or between two lens units constituting the middle group. It is preferable that the aperture diameter of the aperture stop can be changed during focusing. Generally, in a macro lens capable of close-distance imaging with a substantially equal imaging magnification, an F number Fno changes according to an expression C=(1−β)·Fno (C is a constant) as an imaging magnification β changes. Thus, the aperture diameter of the aperture stop is changed according to a change of Fno, thereby unnecessary light beams can be cut off. It is preferable that the aperture stop is disposed between the first focus lens unit and the second focus lens unit. Thereby, a diameter of the aperture stop can be decreased.

It is preferable that the final lens unit includes a negative lens and a positive lens. Thereby, chromatic aberrations generated in the final lens unit can be corrected.

It is preferable that the first lens unit does not move (is fixed) during focusing. By setting the first lens unit that is likely to be heavier than other lens units to be immovable during focusing, high-speed focusing can be achieved. Moreover, focusing on an object at a close distance can be performed at a short working distance, enabling close-distance imaging. Furthermore, a lens barrel can be configured to have high resistance to a pressure from outside.

The optical systems according to the examples of the present invention will be described below.

Examples 1 and 2

Figure 1B:
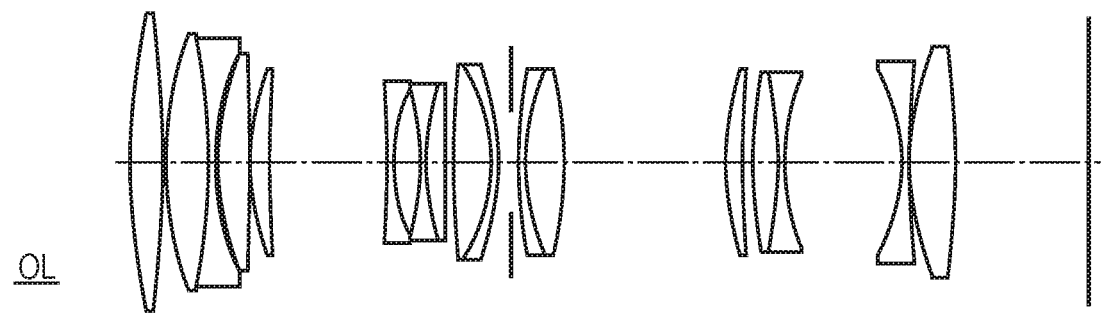
FIG. 1B is a sectional view of the optical system according to Example 1 during focusing on an object at the closest distance.
Figure 2A:
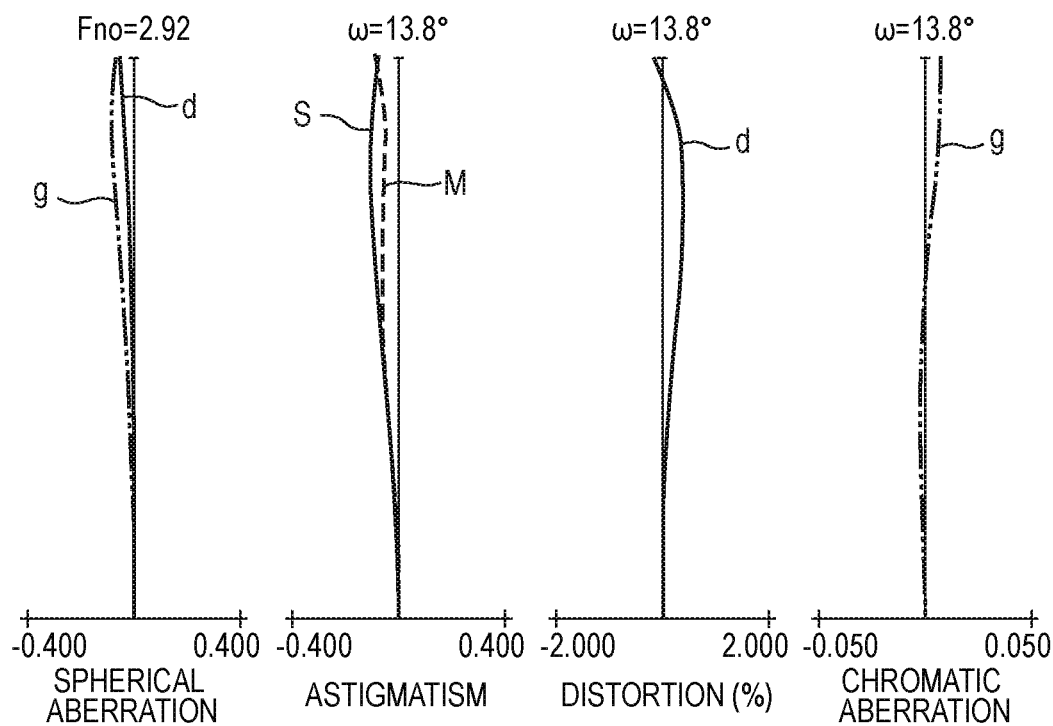
FIG. 2A is an aberration diagram of the optical system according to Example 1 during focusing on an object at infinity.
Figure 2B:
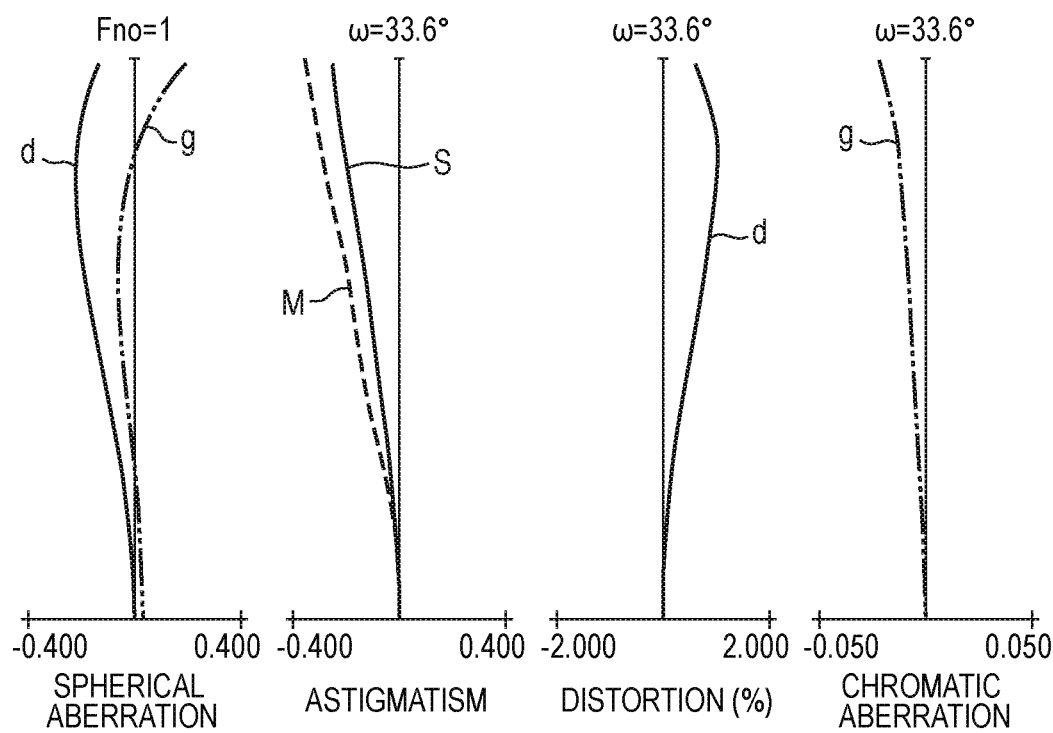
FIG. 2B is an aberration diagram of the optical system according to Example 1 during focusing on an object at the closest distance.

FIG. 1A is a sectional view of an optical system OL according to Example 1 focusing on an object at infinity. FIG. 1B is a sectional view of the optical system OL according to Example 1 focusing on an object at the closest distance. FIG. 2A is an aberration diagram of the optical system OL according to Example 1 focusing on an object at infinity. FIG. 2B is an aberration diagram of the optical system OL according to Example 1 focusing on an object at the closest distance.

Figure 3A:
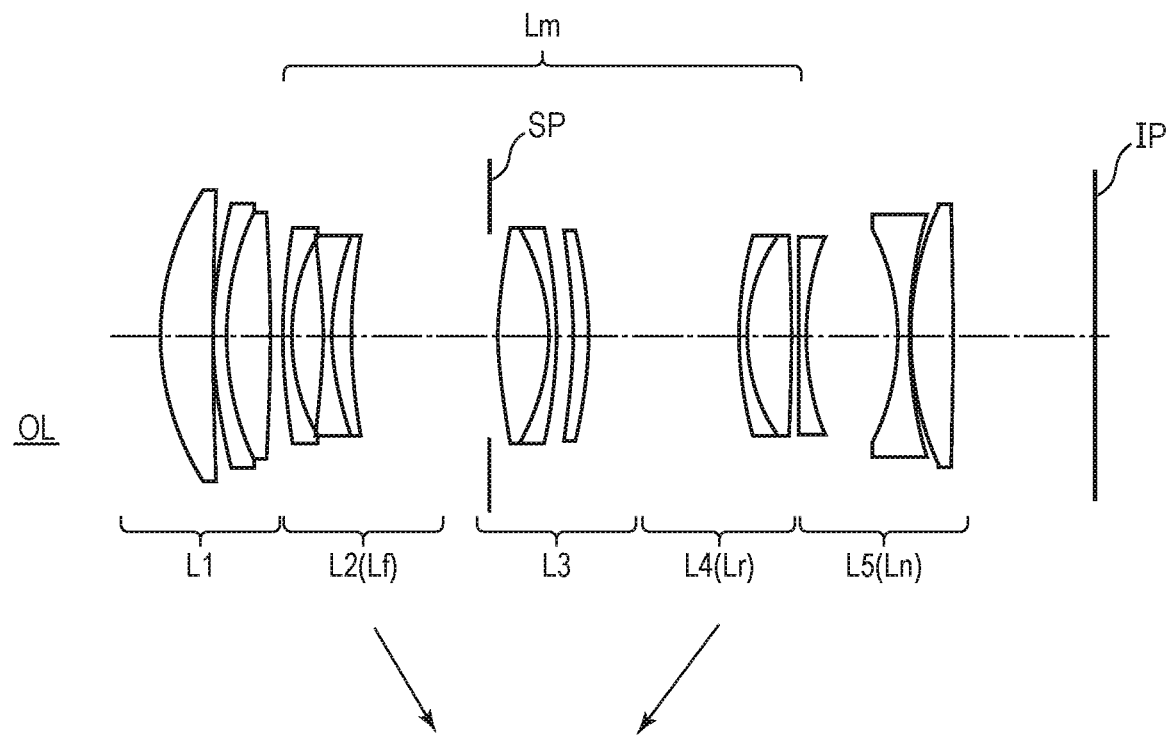
FIG. 3A is a sectional view of an optical system according to Example 2 during focusing on an object at infinity.
Figure 3B:
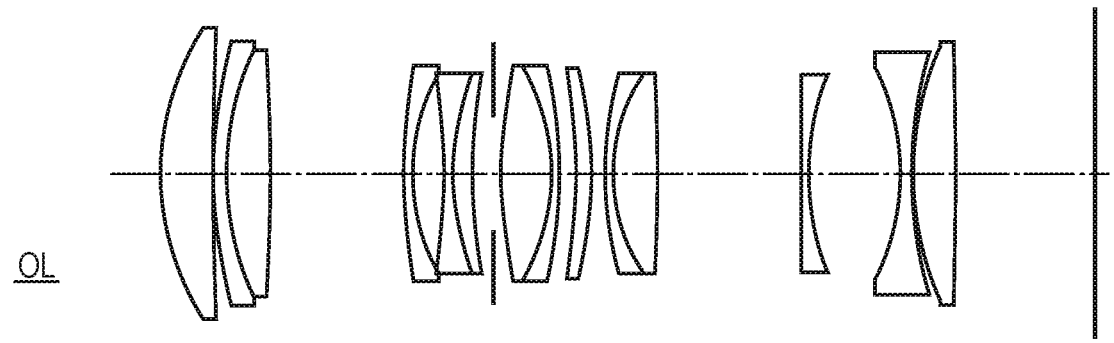
FIG. 3B is a sectional view of the optical system according to Example 2 during focusing on an object at the closest distance.
Figure 4A:
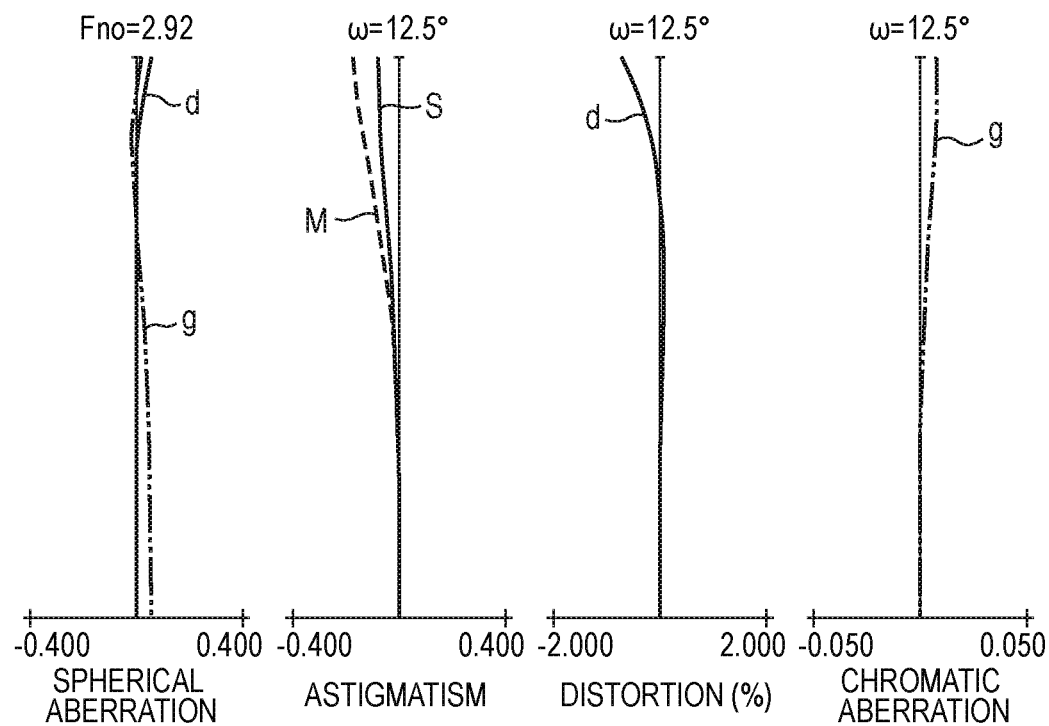
FIG. 4A is an aberration diagram of the optical system according to Example 2 during focusing on an object at infinity.
Figure 4B:
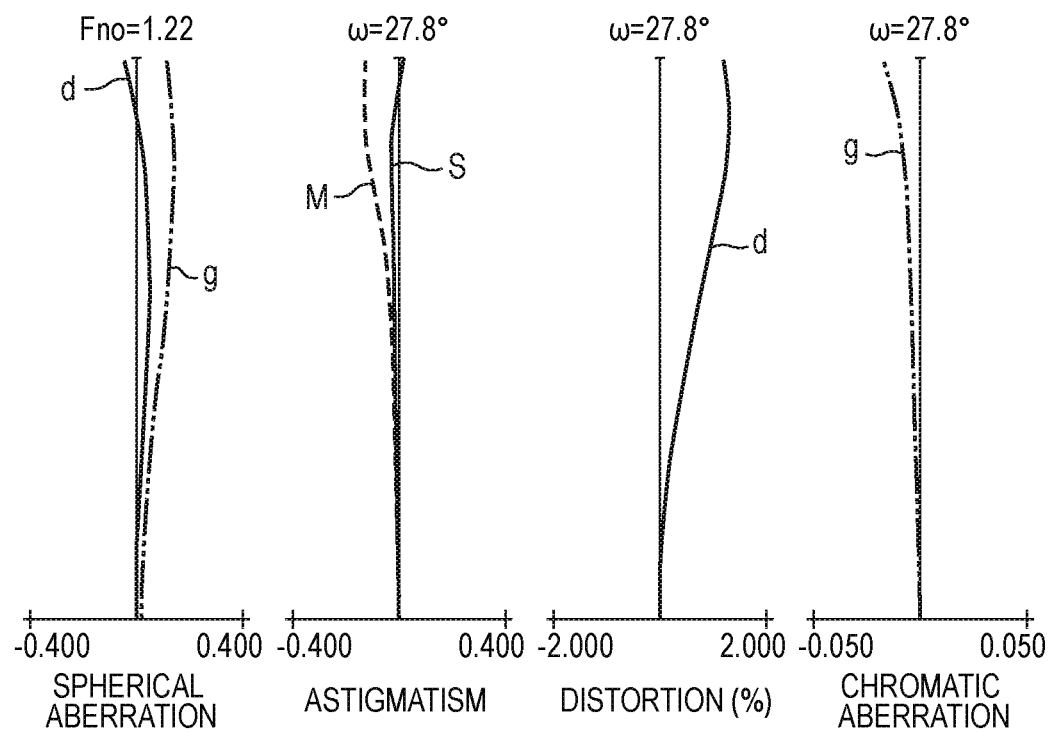
FIG. 4B is an aberration diagram of the optical system according to Example 2 during focusing on an object at the closest distance.

FIG. 3A is a sectional view of the optical system OL according to Example 2 focusing on an object at infinity. FIG. 3B is a sectional view of the optical system OL according to Example 2 focusing on an object at the closest distance. FIG. 4A is an aberration diagram of the optical system OL according to Example 2 focusing on an object at infinity. FIG. 4B is an aberration diagram of the optical system OL according to Example 2 focusing on an object at the closest distance.

The optical systems OL according to Examples 1 and 2 each consists of a first lens unit L1 having positive refractive power, a second lens unit L2 having negative refractive power, a third lens unit L3 having positive refractive power, a fourth lens unit L4 having positive refractive power and a fifth lens unit L5 serving as a final lens unit Ln having negative refractive power, disposed in order from the object side to the image side. In the optical systems OL according to Examples 1 and 2, a middle group Lm consists of the second lens unit L2, the third lens unit L3 and the fourth lens unit L4, and the third lens unit L3 includes an aperture stop SP.

During focusing from an object at infinity to an object at a close distance in the optical systems OL according to Examples 1 and 2, the second lens unit L2 serving as a first focus lens unit Lf moves toward the image side, whereas the fourth lens unit L4 serving as a second focus lens unit Lr moves toward the object side. Other lens units do not move during focusing.

The optical systems OL according to Examples 1 and 2 have basic lens unit configurations that are identical to each other. Lenses used in the optical systems are made of different materials and have different shapes.

Example 3

Figure 5A:
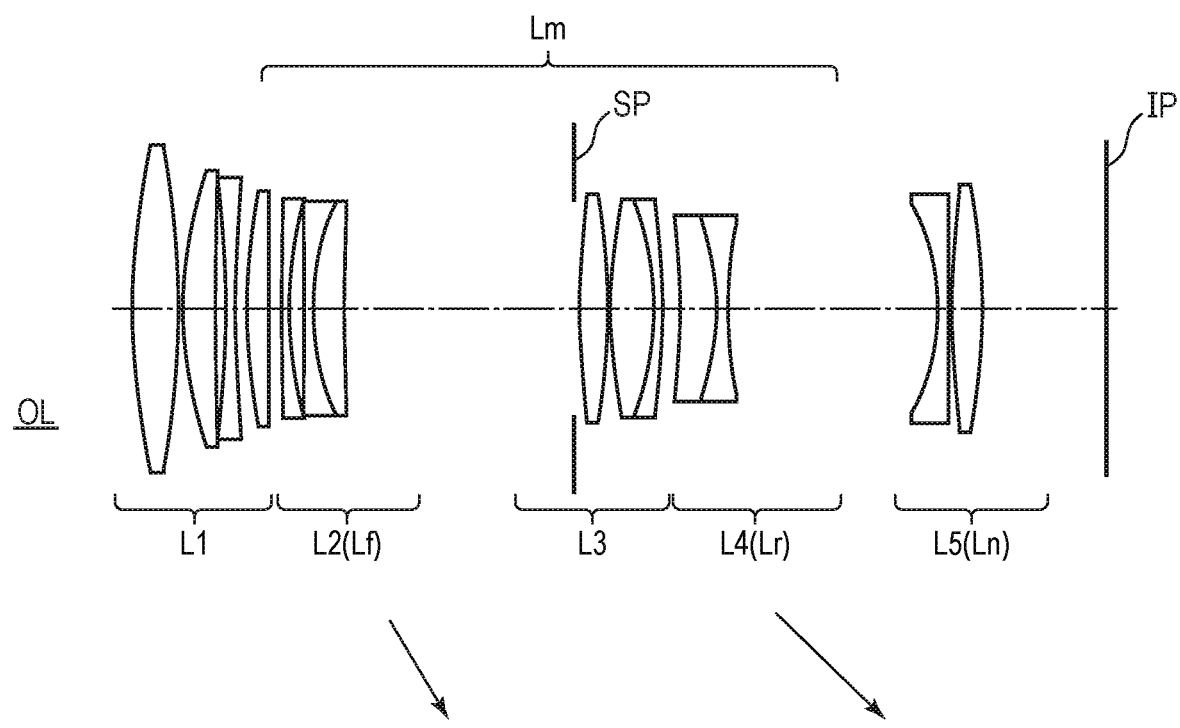
FIG. 5A is a sectional view of an optical system according to Example 3 during focusing on an object at infinity.
Figure 5B:
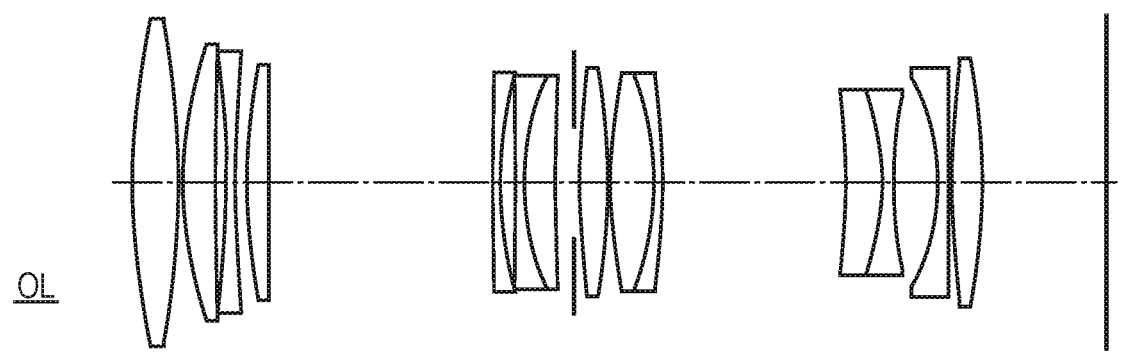
FIG. 5B is a sectional view of the optical system according to Example 3 during focusing on an object at the closest distance.
Figure 6A:
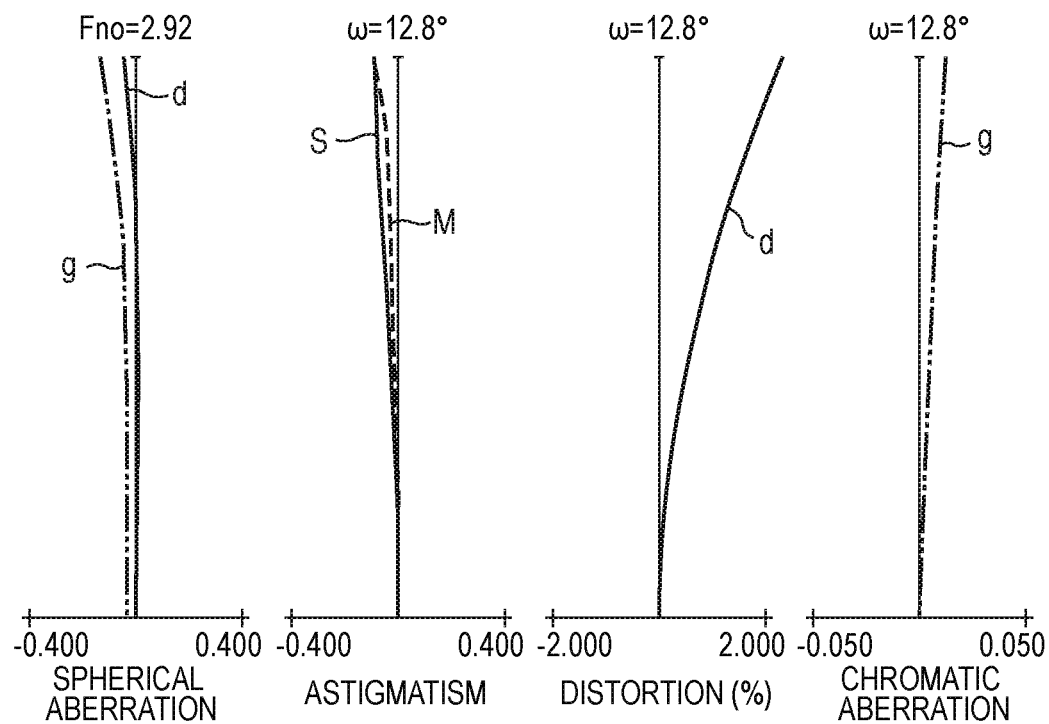
FIG. 6A is an aberration diagram of the optical system according to Example 3 during focusing on an object at infinity.
Figure 6B:
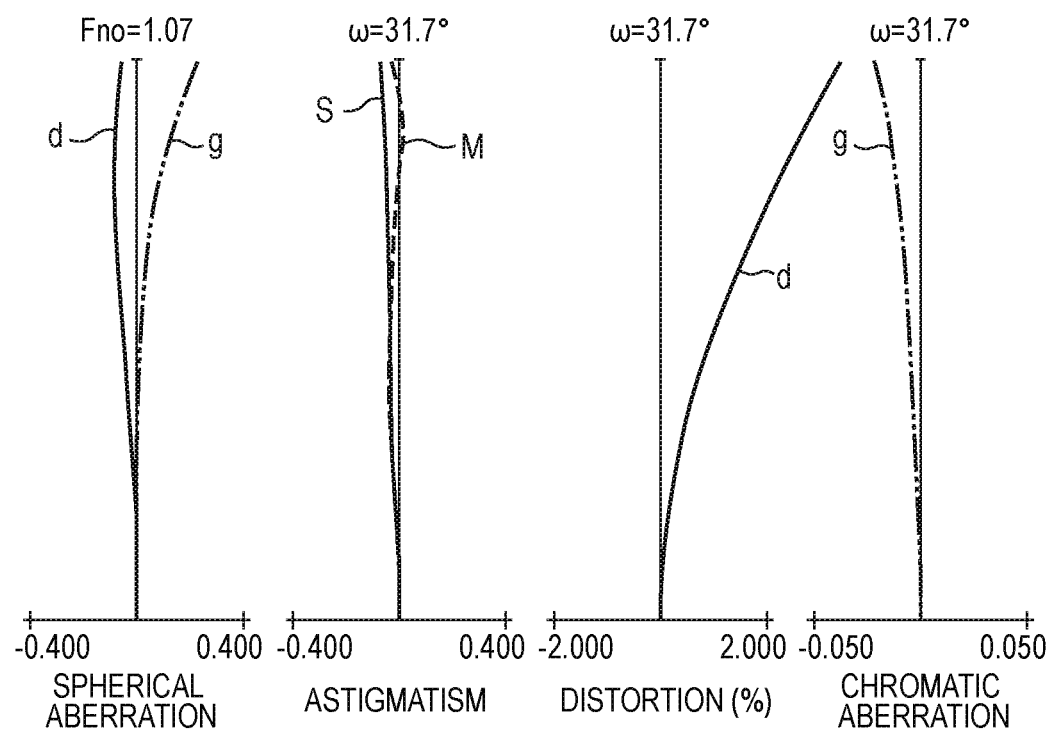
FIG. 6B is an aberration diagram of the optical system according to Example 3 during focusing on an object at the closest distance.

FIG. 5A is a sectional view of an optical system OL according to Example 3 focusing on an object at infinity. FIG. 5B is a sectional view of the optical system OL according to Example 3 focusing on an object at the closest distance. FIG. 6A is an aberration diagram of the optical system OL according to Example 3 focusing on an object at infinity. FIG. 6B is an aberration diagram of the optical system OL according to Example 3 focusing on an object at the closest distance.

The optical system OL according to Example 3 consists of a first lens unit L1 having positive refractive power, a second lens unit L2 having negative refractive power, a third lens unit L3 having positive refractive power, a fourth lens unit L4 having negative refractive power and a fifth lens unit L5 serving as a final lens unit Ln having negative refractive power, disposed in order from the object side to the image side. In the optical system OL according to Example 3, a middle group Lm consists of the second lens unit L2, the third lens unit L3 and the fourth lens unit L4, and the third lens unit L3 includes an aperture stop SP.

During focusing from an object at infinity to an object at a close distance in the optical system OL according to Example 3, the second lens unit L2 serving as a first focus lens unit Lf moves toward the image side, whereas the fourth lens unit L4 serving as a second focus lens unit Lr moves toward the image side. Other lens units do not move during focusing.

Example 4

Figure 7A:
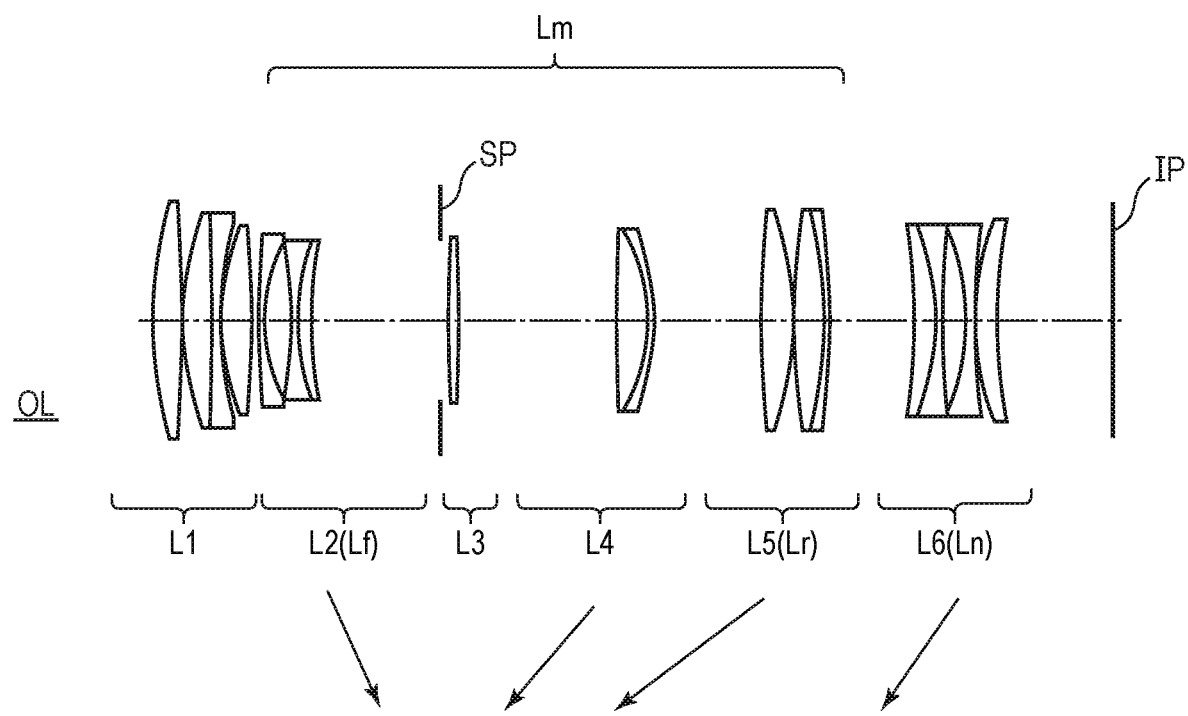
FIG. 7A is a sectional view of an optical system according to Example 4 during focusing on an object at infinity.
Figure 7B:
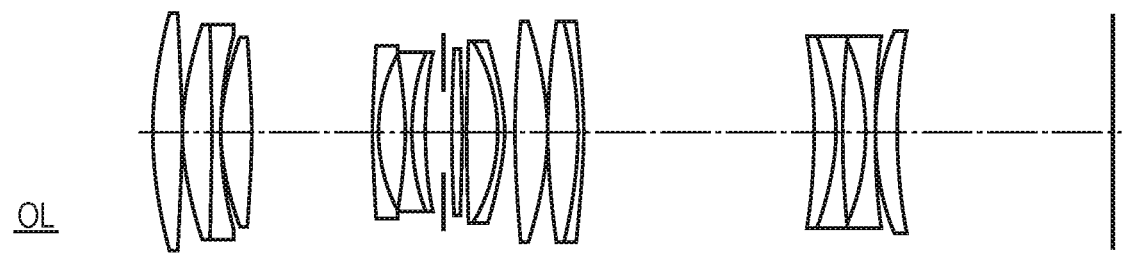
FIG. 7B is a sectional view of the optical system according to Example 4 during focusing on an object at the closest distance.
Figure 8A:
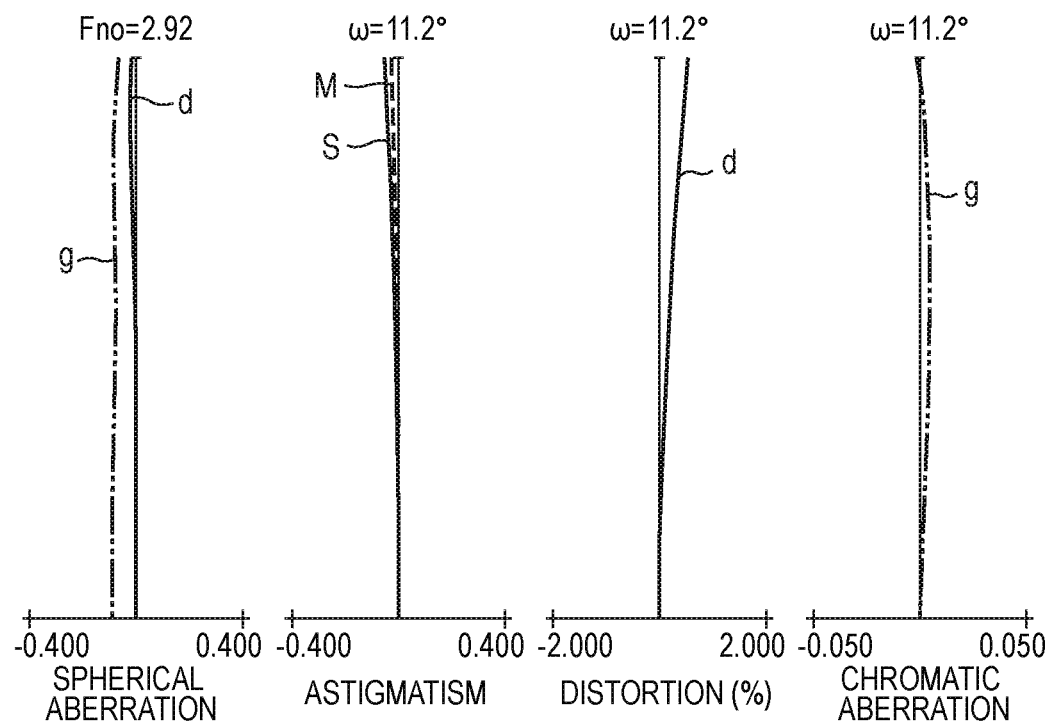
FIG. 8A is an aberration diagram of the optical system according to Example 4 during focusing on an object at infinity.
Figure 8B:
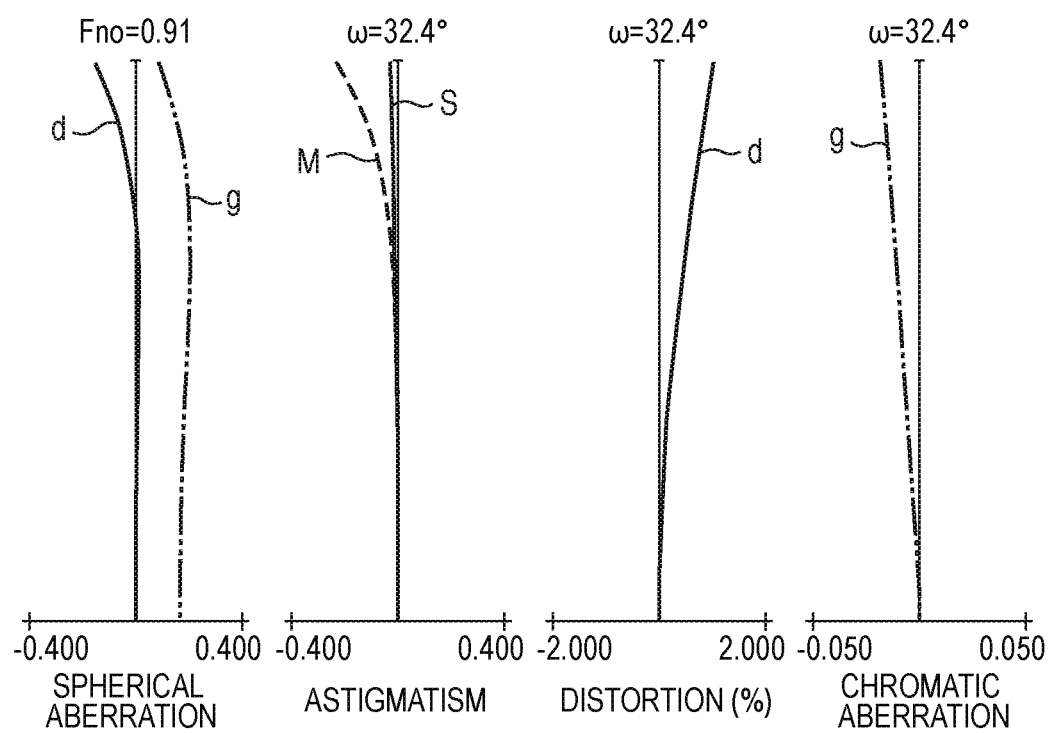
FIG. 8B is an aberration diagram of the optical system according to Example 4 during focusing on an object at the closest distance.

FIG. 7A is a sectional view of an optical system OL according to Example 4 focusing on an object at infinity. FIG. 7B is a sectional view of the optical system OL according to Example 4 focusing on an object at the closest distance. FIG. 8A is an aberration diagram of the optical system OL according to Example 4 focusing on an object at infinity. FIG. 8B is an aberration diagram of the optical system OL according to Example 4 focusing on an object at the closest distance.

The optical system OL according to Example 4 consists of a first lens unit L1 having positive refractive power, a second lens unit L2 having negative refractive power, a third lens unit L3 having positive refractive power, a fourth lens unit L4 having positive refractive power, a fifth lens unit L5 having positive refractive power and a sixth lens unit L6 serving as a final lens unit Ln having negative refractive power, disposed in order from the object side to the image side. In the optical system OL according to Example 4, a middle group Lm consists of the second lens unit L2, the third lens unit L3, the fourth lens unit L4 and the fifth lens unit L5, and the third lens unit L3 includes an aperture stop SP.

During focusing from an object at infinity to an object at a close distance in the optical systems OL according to Example 4, the second lens unit L2 serving as a first focus lens unit Lf moves toward the image side, whereas the fifth lens unit L5 serving as a second focus lens unit Lr moves toward the object side. Moreover, during focusing from the object at infinity to the object at a close distance, the fourth lens unit L4 moves toward the object side, whereas the sixth lens unit L6 moves toward to object side. Other lens units do not move during focusing.

Example 5

Figure 9A:
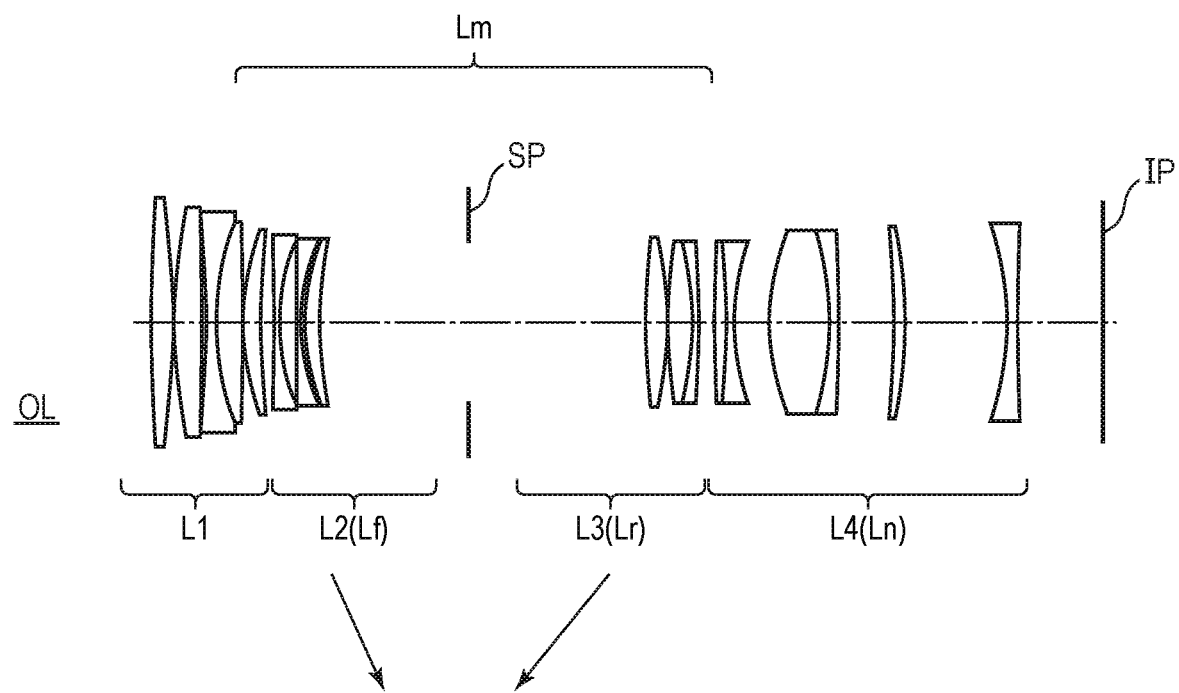
FIG. 9A is a sectional view of an optical system according to Example 5 during focusing on an object at infinity.
Figure 9B:
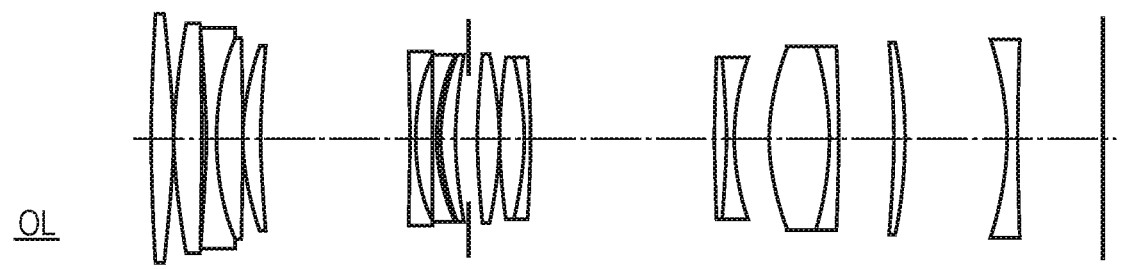
FIG. 9B is a sectional view of the optical system according to Example 5 during focusing on an object at the closest distance.
Figure 10A:
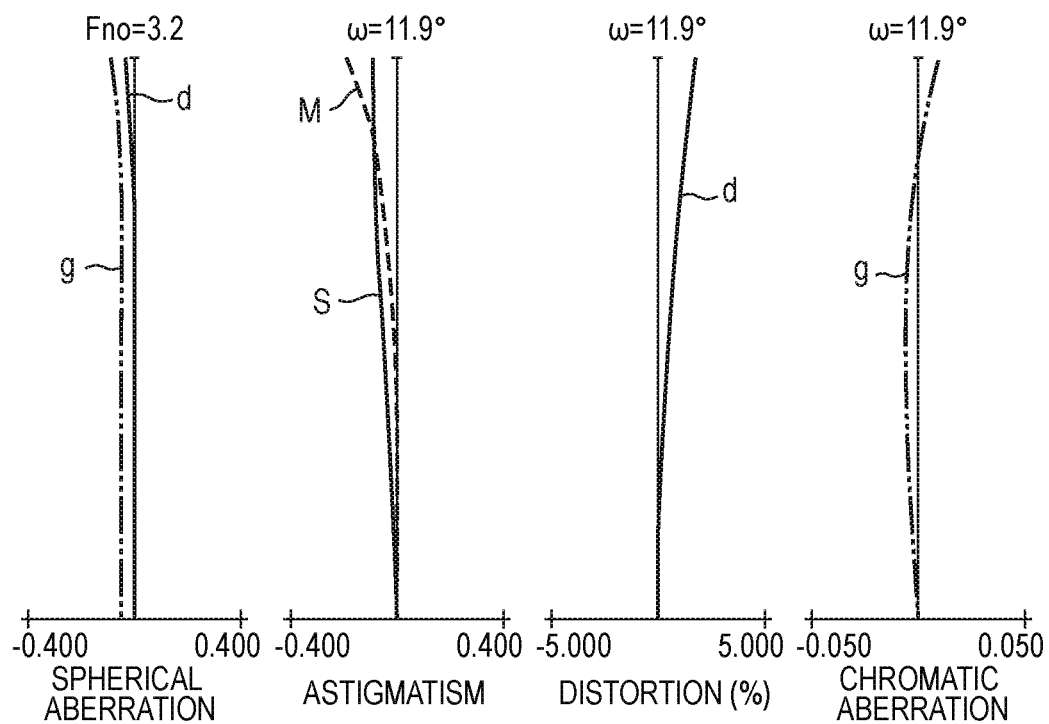
FIG. 10A is an aberration diagram of the optical system according to Example 5 during focusing on an object at infinity.
Figure 10B:
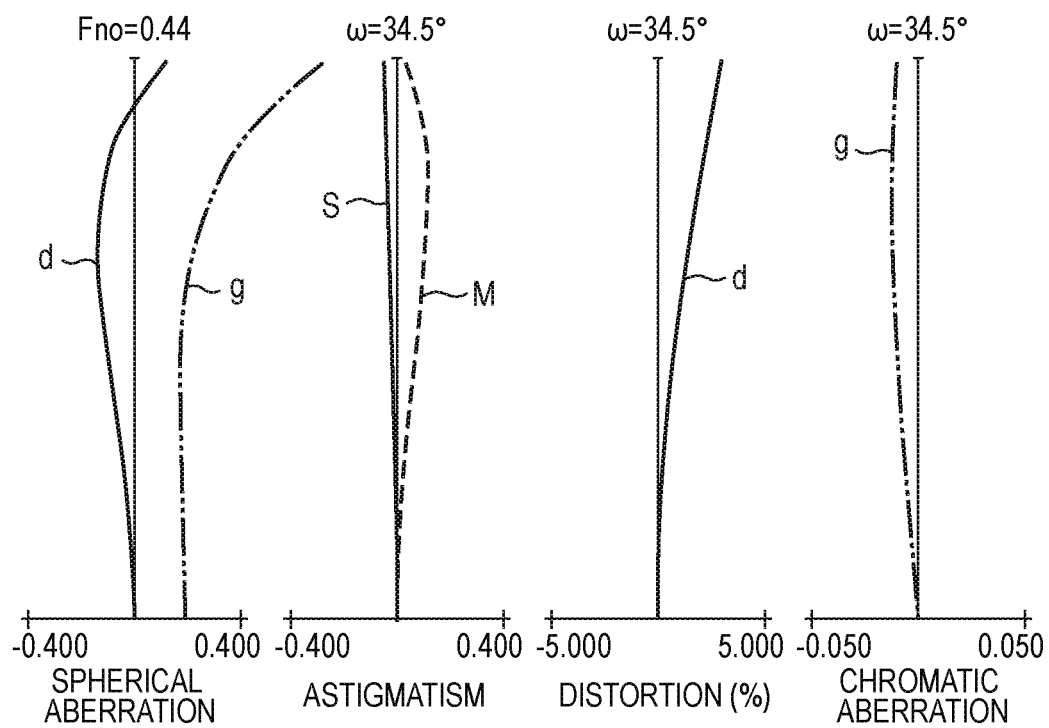
FIG. 10B is an aberration diagram of the optical system according to Example 5 during focusing on an object at the closest distance.

FIG. 9A is a sectional view of an optical system OL according to Example 5 focusing on an object at infinity. FIG. 9B is a sectional view of the optical system OL according to Example 5 focusing on an object at the closest distance. FIG. 10A is an aberration diagram of the optical system OL according to Example 5 focusing on an object at infinity. FIG. 10B is an aberration diagram of the optical system OL according to Example 5 focusing on an object at the closest distance.

The optical system OL according to Example 5 consists of a first lens unit L1 having positive refractive power, a second lens unit L2 having negative refractive power, a third lens unit L3 having positive refractive power and a fourth lens unit L4 serving as a final lens unit Ln having negative refractive power, disposed in order from the object side to the image side. In the optical system OL according to Example 5, a middle group Lm consists of the second lens unit L2 and the third lens unit L3. An aperture stop SP not moving during focusing is disposed between the second lens unit L2 and the third lens unit L3.

During focusing from an object at infinity to an object at a close distance in the optical systems OL according to Example 5, the second lens unit L2 serving as a first focus lens unit Lf moves toward the image side, whereas the third lens unit L3 serving as a second focus lens unit Lr moves toward the object side. Other lens units do not move during focusing.

The optical systems OL according to Examples 1 to 5 simultaneously satisfy the conditional expressions (1) to (9). Thus, the optical system has a compact configuration with high optical performance over entire object distance.

NUMERICAL EXAMPLES

Numerical examples 1 to 5 corresponding to Examples 1 to 5 will be described below. In numerical examples 1 to 5, surface numbers indicate the order of optical surfaces from the object side. r denotes a curvature radius (mm) of the optical surface, d denotes an interval (mm) between the adjacent optical surfaces, nd denotes a refractive index of a material of an optical member at a d-line and vd denotes an Abbe number of the material of the optical member with respect to the d line. The Abbe number is defined as has been discussed above. BF indicates a back focus. In numerical example 4, a back focus during focusing at infinity is described.

In each numerical examples, aspheric surfaces are indicated by surface numbers with * on the right. When the optical axis direction is defined as the X axis, a direction perpendicular to the optical axis is defined as the H axis, a travel direction of light is defined as positive, R denotes a paraxial curvature radius, K denotes a conic constant, A4, A6, A8, A10 and A12 denote aspheric coefficients, an aspheric shape is determined by the following expression:

$$X = \frac{H^2/R}{1+\sqrt{1-(1+K)(H/R)^2}} + A4 \cdot H^4 + A6 \cdot H^6 + A8 \cdot H^8 + A10 \cdot H^{10} + A12 \cdot H^{12}.$$

Further, "e-x" of the aspheric coefficient means $10^{-x}$.

In Table 1, values in numerical examples 1 to 5 are indicated for the conditional expressions (1) to (9).

Numerical Example 1

| Unit mm | | | | |
|---|---|---|---|---|
| Surface data | | | | |
| Surface number | r | d | nd | vd |
| 1 | 96.836 | 4.87 | 1.76385 | 48.5 |
| 2 | −220.851 | 0.55 | | |
| 3 | 57.376 | 6.34 | 1.49700 | 81.5 |
| 4 | −107.096 | 0.03 | | |
| 5 | −106.162 | 1.30 | 1.72825 | 28.5 |
| 6 | 38.926 | 0.30 | | |
| 7 | 42.516 | 4.61 | 1.59282 | 68.6 |
| 8 | −620.513 | 0.15 | | |
| 9 | 40.421 | 2.85 | 1.72916 | 54.7 |
| 10 | 164.248 | (Variable) | | |
| 11 | −277.848 | 0.90 | 1.87070 | 40.7 |
| 12 | 25.829 | 4.07 | | |
| 13 | −43.761 | 0.85 | 1.72916 | 54.7 |
| 14 | 39.787 | 3.03 | 1.95906 | 17.5 |
| 15 | −524.319 | (Variable) | | |
| 16 | 132.128 | 5.64 | 1.58313 | 59.4 |
| 17 | −27.930 | 1.05 | 2.05090 | 26.9 |
| 18 | −42.695 | 1.90 | | |
| 19(Aperture) | ∞ | (Variable) | | |

-continued

Unit mm

| | | | | |
|---|---|---|---|---|
| 20 | 75.644 | 0.95 | 2.05090 | 26.9 |
| 21 | 33.694 | 5.84 | 1.77250 | 49.6 |
| 22 | −62.013 | (Variable) | | |
| 23 | 45.773 | 2.45 | 1.72916 | 54.7 |
| 24 | 136.036 | 1.66 | | |
| 25 | 74.978 | 3.73 | 1.80810 | 22.8 |
| 26 | −65.999 | 1.00 | 1.90043 | 37.4 |
| 27 | 32.690 | 17.63 | | |
| 28 | −28.701 | 1.00 | 1.73800 | 32.3 |
| 29 | 116.590 | 0.15 | | |
| 30 | 42.289 | 6.84 | 1.49700 | 81.5 |
| 31 | −151.590 | (Variable) | | |
| Image plane | ∞ | | | |

Various Data

| | |
|---|---|
| Focal length | 87.82 |
| F number | 2.92 |
| Half angle of view (degree) | 13.84 |
| Image height | 21.64 |
| Total lens length | 143.81 |
| BF | 20.02 |

| | Infinity | β = −0.5 | β = −1.5 |
|---|---|---|---|
| d10 | 1.76 | 7.29 | 17.30 |
| d15 | 16.87 | 11.22 | 1.23 |
| d19 | 23.74 | 15.19 | 0.85 |
| d22 | 1.74 | 10.31 | 24.69 |
| d31 | 20.02 | −11.00 | −28.86 |

Lens unit data

| Unit | Starting surface | Focal length |
|---|---|---|
| 1 | 1 | 38.63 |
| 2 | 11 | −21.29 |
| 3 | 16 | 81.25 |
| 4 | 20 | 56.10 |
| 5 | 23 | −46.38 |

Numerical Example 2

Unit mm

Surface data

| Surface number | r | d | nd | vd |
|---|---|---|---|---|
| 1 | 33.942 | 6.92 | 1.49700 | 81.5 |
| 2 | 436.947 | 0.12 | | |
| 3 | 65.294 | 1.60 | 1.89286 | 20.4 |
| 4 | 37.377 | 0.14 | | |
| 5* | 35.679 | 5.70 | 1.58313 | 59.4 |
| 6* | −220.264 | (Variable) | | |
| 7 | 73.559 | 1.10 | 1.59349 | 67.0 |
| 8 | 26.950 | 4.20 | | |
| 9 | −86.908 | 1.10 | 1.80400 | 46.5 |
| 10 | 33.422 | 2.57 | 1.95906 | 17.5 |
| 11 | 70.271 | (Variable) | | |
| 12(Aperture) | ∞ | 1.03 | | |
| 13 | 60.792 | 6.67 | 1.49700 | 81.5 |
| 14 | −27.310 | 0.99 | 1.67300 | 38.3 |
| 15 | −65.219 | 2.14 | | |
| 16 | −88.779 | 2.15 | 1.88100 | 40.1 |
| 17 | −52.824 | (Variable) | | |
| 18 | 46.556 | 1.00 | 1.95375 | 32.3 |
| 19 | 22.998 | 5.80 | 1.75500 | 52.3 |
| 20 | −336.342 | (Variable) | | |
| 21 | 1033.026 | 1.00 | 1.48749 | 70.2 |
| 22 | 33.675 | 12.14 | | |
| 23 | −30.124 | 1.45 | 1.49700 | 81.5 |
| 24 | 53.591 | 0.14 | | |

-continued

Unit mm

| | | | | |
|---|---|---|---|---|
| 25 | 39.693 | 5.57 | 1.51742 | 52.4 |
| 26 | −952.390 | (Variable) | | |
| Image plane | ∞ | | | |

Aspheric surface data

Fifth surface

K = 0.00000e+000 A 4 = −2.49717e−006 A 6 = −3.58259e−009 A 8 = 9.47256e−013 A10 = −3.03188e−015

Sixth surface

K = 0.00000e+000 A 4 = 3.03399e−006 A 6 = −4.06178e−009 A 8 = 9.02518e−012 A10 = −9.90183e−015

Various Data

| | |
|---|---|
| Focal length | 97.62 |
| F number | 2.92 |
| Half angle of view (degree) | 12.50 |
| Image height | 21.64 |
| Total lens length | 123.21 |
| BF | 18.86 |

| | Infinity | β = −0.5 | β = −1.0 |
|---|---|---|---|
| d6 | 1.69 | 8.71 | 17.03 |
| d11 | 18.27 | 11.22 | 3.02 |
| d17 | 19.86 | 9.55 | 1.48 |
| d20 | 1.00 | 11.28 | 19.40 |
| d26 | 18.86 | −11.03 | −22.39 |

Lens unit data

| Unit | Starting surface | Focal length |
|---|---|---|
| 1 | 1 | 46.16 |
| 2 | 7 | −29.84 |
| 3 | 12 | 55.02 |
| 4 | 18 | 71.09 |
| 5 | 21 | −35.74 |

Numerical Example 3

Unit mm

Surface data

| Surface number | r | d | nd | vd |
|---|---|---|---|---|
| 1 | 90.562 | 5.96 | 1.61997 | 63.9 |
| 2 | −108.830 | 0.50 | | |
| 3 | 51.135 | 4.21 | 1.59282 | 68.6 |
| 4 | 524.980 | 1.35 | | |
| 5 | −119.027 | 1.20 | 2.00069 | 25.5 |
| 6 | 180.430 | 1.50 | | |
| 7 | 76.440 | 2.82 | 1.59282 | 68.6 |
| 8 | −2773.639 | (Variable) | | |
| 9 | 645.509 | 1.00 | 1.95375 | 32.3 |
| 10 | 49.544 | 2.04 | | |
| 11 | −413.410 | 1.00 | 2.00100 | 29.1 |
| 12 | 30.426 | 4.22 | 1.95906 | 17.5 |
| 13 | 518.367 | (Variable) | | |
| 14(Aperture) | ∞ | 0.75 | | |
| 15 | 123.605 | 3.65 | 1.88300 | 40.8 |
| 16 | −76.877 | 0.20 | | |
| 17 | 64.331 | 5.67 | 1.67003 | 47.2 |
| 18 | −38.033 | 1.10 | 1.95906 | 17.5 |
| 19 | −90.082 | (Variable) | | |
| 20 | −107.861 | 4.72 | 1.95906 | 17.5 |
| 21 | −33.963 | 1.50 | 1.72825 | 28.5 |
| 22 | 54.658 | (Variable) | | |
| 23 | −27.650 | 1.50 | 1.88300 | 40.8 |

-continued

| Unit mm | | | | |
|---|---|---|---|---|
| 24 | −1214.212 | 0.15 | | |
| 25 | 106.154 | 4.10 | 1.53172 | 48.8 |
| 26 | −81.520 | (Variable) | | |
| Image plane | ∞ | | | |

Various Data

| Focal length | 95.36 |
|---|---|
| F number | 2.92 |
| Half angle of view (degree) | 12.78 |
| Image height | 21.64 |
| Total lens length | 125.16 |
| BF | 15.84 |

| | Infinity | β = −0.5 | β = −1.0 |
|---|---|---|---|
| d8 | 1.56 | 12.82 | 28.73 |
| d13 | 29.38 | 18.13 | 2.22 |
| d19 | 2.21 | 11.55 | 23.69 |
| d22 | 27.03 | 16.93 | 5.72 |
| d26 | 15.84 | −11.34 | −19.22 |

Lens unit data

| Unit | Starting surface | Focal length |
|---|---|---|
| 1 | 1 | 58.10 |
| 2 | 9 | −42.14 |
| 3 | 14 | 31.98 |
| 4 | 20 | −64.18 |
| 5 | 23 | −53.04 |

Numerical Example 4

| Unit mm | | | | |
|---|---|---|---|---|
| Surface data | | | | |
| Surface number | r | d | nd | vd |
| 1 | 79.793 | 5.27 | 1.49700 | 81.5 |
| 2 | −312.910 | 0.15 | | |
| 3 | 57.058 | 5.24 | 1.76385 | 48.5 |
| 4 | −864.124 | 1.60 | 1.85478 | 24.8 |
| 5 | 64.788 | 0.14 | | |
| 6* | 44.013 | 5.52 | 1.49710 | 81.6 |
| 7* | −177.556 | (Variable) | | |
| 8 | 151.443 | 1.10 | 1.72916 | 54.7 |
| 9 | 30.762 | 4.86 | | |
| 10 | −84.909 | 1.10 | 1.59349 | 67.0 |
| 11 | 39.902 | 2.60 | 1.95906 | 17.5 |
| 12 | 77.076 | (Variable) | | |
| 13(Aperture) | ∞ | 1.62 | | |
| 14 | 233.437 | 1.93 | 1.43387 | 95.1 |
| 15 | −1499.976 | (Variable) | | |
| 16 | 311.326 | 5.50 | 1.43875 | 94.7 |
| 17 | −34.375 | 1.20 | 1.90043 | 37.4 |
| 18 | −48.400 | (Variable) | | |
| 19 | 177.221 | 5.95 | 1.43387 | 95.1 |
| 20 | −61.557 | 0.00 | | |
| 21 | 116.103 | 5.60 | 1.55032 | 75.5 |
| 22 | −81.684 | 1.00 | 2.05090 | 26.9 |
| 23 | −169.142 | (Variable) | | |
| 24 | −105.477 | 3.73 | 2.00069 | 25.5 |
| 25 | −47.370 | 1.30 | 1.49700 | 81.5 |
| 26 | 151.951 | 4.32 | | |
| 27 | −42.369 | 1.50 | 1.72916 | 54.7 |
| 28 | 111.159 | 0.15 | | |
| 29 | 48.618 | 4.00 | 1.43875 | 94.7 |
| 30 | 90.968 | (Variable) | | |
| Image plane | ∞ | | | |

Aspheric surface data

Sixth surface

K = 0.00000e+000 A 4 = −5.55343e−007 A 6 = −5.08149e−010 A 8 = 1.50360e−012 A10 = −5.65017e−015

Seventh surface

K = 0.00000e+000 A 4 = 2.62452e−006 A 6 = −1.41166e−009 A 8 = 6.43676e−013 A10 = −2.18295e−015

Various Data

| Focal length | 109.58 |
|---|---|
| F number | 2.92 |
| Half angle of view (degree) | 11.17 |
| Image height | 21.64 |
| Total lens length | 175.01 |
| BF | 21.20 |

| | Infinity | β = −1.0 | β = −2.0 |
|---|---|---|---|
| d7 | 1.19 | 11.49 | 21.51 |
| d12 | 23.30 | 13.00 | 2.99 |
| d15 | 28.81 | 1.00 | 0.99 |
| d18 | 19.57 | 19.71 | 1.90 |
| d23 | 15.55 | 40.93 | 41.87 |
| d30 | 21.20 | −24.81 | −27.92 |

Lens unit data

| Unit | Starting surface | Focal length |
|---|---|---|
| 1 | 1 | 46.82 |
| 2 | 8 | −32.98 |
| 3 | 13 | 465.73 |
| 4 | 16 | 149.37 |
| 5 | 19 | 70.57 |
| 6 | 24 | −44.84 |

Numerical Example 5

| Unit mm | | | | |
|---|---|---|---|---|
| Surface data | | | | |
| Surface number | r | d | nd | vd |
| 1 | ∞ | 2.65 | | |
| 2 | 280.506 | 3.86 | 1.90366 | 31.3 |
| 3 | −155.521 | 0.18 | | |
| 4 | 90.445 | 4.98 | 1.61800 | 63.4 |
| 5 | −428.051 | 0.72 | | |
| 6 | −168.375 | 1.76 | 1.85478 | 24.8 |
| 7 | 49.135 | 0.16 | | |
| 8 | 50.643 | 4.33 | 1.59282 | 68.6 |
| 9 | −3862.730 | 0.16 | | |
| 10 | 47.252 | 3.14 | 1.76385 | 48.5 |
| 11 | 168.899 | (Variable) | | |
| 12 | −3318.610 | 1.10 | 1.71300 | 53.9 |
| 13 | 37.460 | 2.85 | | |
| 14 | 2814.658 | 1.00 | 1.54814 | 45.8 |
| 15 | 35.083 | 0.50 | | |
| 16 | 36.820 | 2.77 | 1.94595 | 18.0 |
| 17 | 71.909 | (Variable) | | |
| 18(Aperture) | ∞ | (Variable) | | |
| 19 | 118.625 | 3.76 | 1.76385 | 48.5 |

-continued

Unit mm

| | | | | |
|---|---|---|---|---|
| 20 | −72.671 | 0.20 | | |
| 21 | 94.570 | 4.31 | 1.49700 | 81.5 |
| 22 | −55.657 | 0.02 | | |
| 23 | −55.917 | 1.10 | 1.85478 | 24.8 |
| 24 | −202.945 | (Variable) | | |
| 25 | 293.527 | 2.05 | 1.80809 | 22.8 |
| 26 | −142.811 | 1.33 | 1.83481 | 42.7 |
| 27 | 41.657 | 6.12 | | |
| 28 | 40.751 | 10.60 | 1.53172 | 48.8 |
| 29 | −58.201 | 1.70 | 1.90366 | 31.3 |
| 30 | −339.901 | 9.70 | | |
| 31 | −186.072 | 1.91 | 1.80518 | 25.4 |
| 32 | −86.876 | 17.95 | | |
| 33 | −54.071 | 1.81 | 1.88300 | 40.8 |
| 34 | 389.203 | (Variable) | | |
| Image plane | ∞ | | | |

Various Data

| | |
|---|---|
| Focal length | 103.00 |
| F number | 2.92 |
| Half angle of view (degree) | 11.86 |
| Image height | 21.64 |
| Total lens length | 167.36 |
| BF | 15.14 |

| | Infinity | β = −1.0 | β = −2.0 |
|---|---|---|---|
| d11 | 2.22 | 10.05 | 25.86 |
| d17 | 26.02 | 18.18 | 2.38 |
| d18 | 31.12 | 20.01 | 1.50 |
| d24 | 2.79 | 13.91 | 32.42 |
| d34 | 0.40 | 0.40 | 0.40 |

Lens unit data

| Unit | Starting surface | Focal length |
|---|---|---|
| 1 | 1 | 55.66 |
| 2 | 12 | −44.91 |
| 3 | 19 | 50.09 |
| 4 | 25 | −41.48 |

TABLE 1

| | Numerical example 1 | Numerical example 2 | Numerical example 3 | Numerical example 4 | Numerical example 5 |
|---|---|---|---|---|---|
| f | 87.82 | 97.62 | 95.48 | 109.58 | 103.00 |
| f1 | 38.63 | 46.16 | 58.10 | 46.82 | 55.66 |
| f2 | −21.29 | −29.84 | −42.14 | −32.98 | −44.91 |
| fr | 56.10 | 71.09 | −64.18 | 70.57 | 50.09 |
| fn | −46.38 | −35.74 | −53.04 | −44.84 | −41.48 |
| DL | 143.82 | 123.21 | 125.19 | 175.01 | 170.01 |
| D2 | 15.54 | −15.26 | −27.27 | −20.31 | 23.64 |
| Dr | −22.89 | 18.40 | 21.48 | −45.49 | 29.62 |
| sk | 20.02 | 18.86 | 15.93 | 21.20 | 15.14 |
| vd2p | 17.47 | 17.47 | 17.47 | 17.47 | 17.98 |
| Conditional expression (1) | −1.89 | −2.73 | −1.80 | −2.44 | −2.48 |
| Conditional expression (2) | 1.21 | 1.99 | 1.21 | 1.57 | 1.21 |
| Conditional expression (3) | 4.39 | 5.18 | 5.99 | 5.17 | 6.80 |
| Conditional expression (4) | 2.27 | 2.11 | 1.64 | 2.34 | 1.85 |
| Conditional expression (5) | 4.13 | 3.27 | 2.27 | 3.32 | 2.29 |
| Conditional expression (6) | 17.47 | 17.47 | 17.47 | 17.47 | 17.98 |
| Conditional expression (7) | 0.11 | 0.12 | 0.22 | 0.12 | 0.14 |
| Conditional expression (8) | 0.16 | 0.15 | 0.17 | 0.26 | 0.17 |

[Example of an Image Pickup Apparatus]

Figure 11:
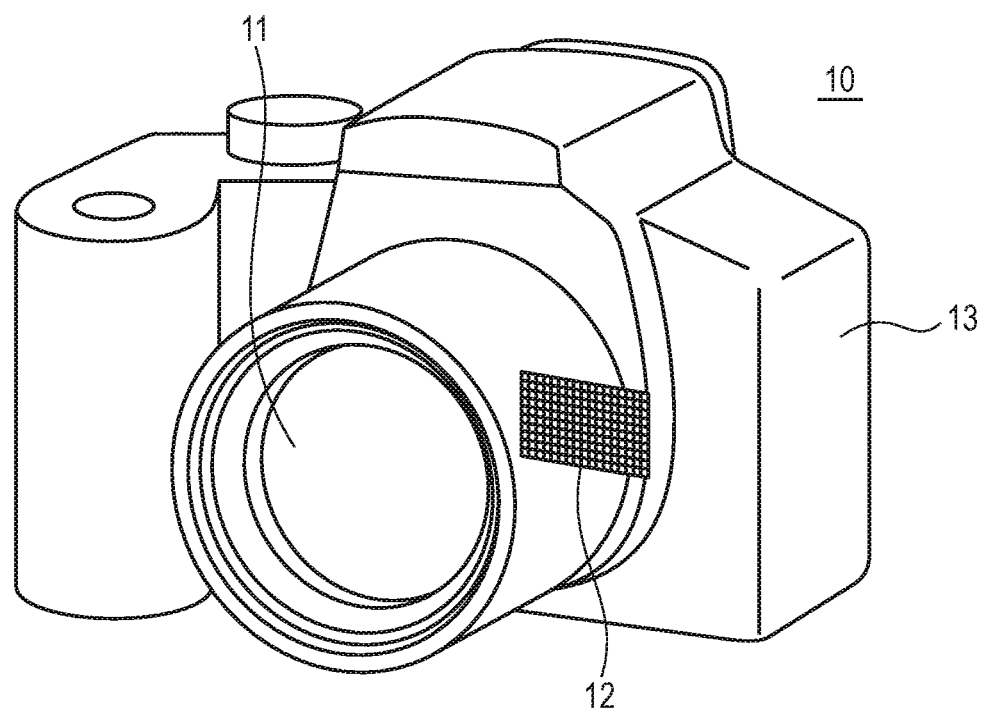
FIG. 11 illustrates the configuration of an image pickup apparatus according to the present embodiment.

Referring to FIG. 11, an example of an image pickup apparatus will be described below. FIG. 11 illustrates the configuration of an image pickup apparatus 10. The image pickup apparatus 10 includes a camera body 13, a lens apparatus 11 including the optical system OL according to any one of Examples 1 to 5 described above, and a light receiving element (image pickup element) 12 that photo-electrically converts an image formed by the optical system OL. The light receiving element 12 may be an image pickup element, such as a CCD sensor or a CMOS sensor. The lens apparatus 11 and the camera body 13 may be integrated into each other or detachably attached to each other. The image pickup apparatus 10 of the present example can have a compact configuration with high optical performance over entire object distance.

The image pickup apparatus 10 of the present invention is not limited to a digital still camera illustrated in FIG. 11. The present invention is applicable to various image pickup apparatuses such as a broadcast camera, a silver film camera, and a surveillance camera.

For example, the signs of the focal lengths of the first focus lens unit and the second focus lens unit and the moving direction during focusing are not limited to those of the examples. The signs of the focal lengths and the moving direction can be changed as necessary according to the magnitude of the refractive powers of the first focus lens unit and second focus lens unit and the relationship between the refractive powers of the first and second focus lens units and other lens units.

For example, the aperture stop SP may move during focusing. If the third lens unit includes a plurality of lenses, the aperture stop SP may be disposed between two of the plurality of lenses.

For example, in the optical system, an image blur may be corrected by moving some of the lenses in a direction including components perpendicular to the optical axis.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-191202, filed Oct. 9, 2018, which is hereby incorporated by reference herein in its entirety.

What is claimed is:

1. An optical system comprising a plurality of lens units, intervals between adjacent lens units being changed during focusing,
wherein the plurality of lens units consists of a first lens unit that has positive refractive power and is disposed closest to an object side, a middle group including at least two lens units, and a final lens unit that has negative refractive power and is disposed closest to an image side,
wherein the middle group includes a first focus lens unit configured to move during focusing, and a second focus lens unit disposed on the image side of the first focus lens unit and configured to move during focusing,
wherein an aperture stop is disposed between two lenses included in the middle group, and
wherein following conditional expressions are satisfied:

$$-7.00 < f/fn < -1.80$$

$$1.10 < |fr/fn| < 5.50$$

where f represents a focal length of the optical system, fn represents a focal length of the final lens unit, and fr represents a focal length of the second focus lens unit.

2. The optical system according to claim 1, wherein a following conditional expression is satisfied:

$$2.50 < f/sk < 9.00$$

where sk represents a back focus of the optical system during focusing on an object at infinity.

3. The optical system according to claim 1, wherein a following conditional expression is satisfied:

$$1.00 < f/f1 < 4.00$$

where f1 represents a focal length of the first lens unit.

4. The optical system according to claim 1, wherein the first focus lens unit is a second lens unit that is disposed closest to the object side in the middle group and has positive or negative refractive power, and wherein a following conditional expression is satisfied:

$$1.50 < f/|f2| < 6.00$$

where f2 represents a focal length of the second lens unit.

5. The optical system according to claim 1,
wherein the first focus lens unit is a second lens unit that is disposed closest to the object side in the middle unit and has positive or negative refractive power,
wherein the second lens unit includes a positive lens, and
wherein a following conditional expression is satisfied:

$$10 < vd2p < 23$$

where vd2p represents an Abbe number with respect to a d-line of a material of the positive lens included in the second lens unit.

6. The optical system according to claim 1,
wherein the middle group includes a second lens unit that is disposed closest to the object side in the middle group and has positive or negative refractive power,
wherein the second lens unit is the first focus lens unit, and
wherein a following conditional expression is satisfied:

$$0.02 < |D2|/DL < 0.40$$

where DL represents a total lens length of the optical system during focusing on an object at infinity and D2 represents a moving amount of the second lens unit during focusing from the object at infinity to the object at a closest distance.

7. The optical system according to claim 1,
wherein the middle group includes a second lens unit that is disposed closest to the object side in the middle group and has positive or negative refractive power,
wherein the second lens unit is the first focus lens unit, and
wherein a following conditional expression is satisfied:

$$0.02 < |Dr|/DL < 0.40$$

where DL represents a total lens length of the optical system during focusing on an object at infinity and Dr represents a moving amount of the second focus lens unit during focusing from the object at infinity to the object at a closest distance.

8. The optical system according to claim 1, wherein a following conditional expression is satisfied:

$$0.50 \le (-\beta)$$

where $\beta$ represents an imaging magnification of the optical system during focusing on an object at a closest distance.

9. The optical system according to claim 1, wherein at least one of the first focus lens unit and the second focus lens unit consists of at most three lenses.

10. The optical system according to claim 1, wherein an aperture diameter of the aperture stop can be changed during focusing.

11. The optical system according to claim 1, wherein the aperture stop is disposed between the first focus lens unit and the second focus lens unit.

12. The optical system according to claim 1, wherein the final lens unit includes a negative lens and a positive lens.

13. The optical system according to claim 1, wherein the first lens unit does not move during focusing.

14. The optical system according to claim 1, wherein the middle group consists of a second lens unit having negative refractive power, a third lens unit having positive refractive power and a fourth lens unit having positive refractive power, disposed in order from the object side to the image side.

15. The optical system according to claim 1, wherein the middle group consists of a second lens unit having negative refractive power, a third lens unit having positive refractive power and a fourth lens unit having negative refractive power, disposed in order from the object side to the image side.

16. The optical system according to claim 1, wherein the middle group consists of a second lens unit having negative refractive power, a third lens unit having positive refractive power, a fourth lens unit having positive refractive power and a fifth lens unit having positive refractive power, disposed in order from the object side to the image side.

17. The optical system according to claim 1, wherein the middle group consists of a second lens unit having negative refractive power and a third lens unit having positive refractive power, disposed in order from the object side to the image side.

18. An image pickup apparatus comprising:
an optical system; and
an image pickup element that receives light of an image formed by the optical system,
wherein the optical system includes a plurality of lens units, intervals between adjacent lens units being changed during focusing,
wherein the plurality of lens units consists of a first lens unit that has positive refractive power and is disposed closest to an object side, a middle group including at least two lens units, and a final lens unit that has negative refractive power and is disposed closest to an image side,
wherein the middle group includes a first focus lens unit configured to move during focusing, and a second focus lens unit disposed on the image side of the first focus lens unit and configured to move during focusing, wherein an aperture stop is disposed between two lenses included in the middle group, and wherein following conditional expressions are satisfied:

$$-7.00 < f/fn < -1.80$$

$$1.10 < |fr/fn| < 5.50$$

where f represents a focal length of the optical system, fn represents a focal length of the final lens unit, and fr represents a focal length of the second focus lens unit.

19. An optical system comprising a plurality of lens units, intervals between adjacent lens units being changed during focusing,
   wherein the plurality of lens units consists of a first lens unit that has positive refractive power and is disposed closest to an object side, a middle group including at least two lens units, and a final lens unit that has negative refractive power and is disposed closest to an image side,
   wherein the middle group includes a first focus lens unit configured to move during focusing, and a second focus lens unit disposed on the image side of the first focus lens unit and configured to move during focusing,
   wherein an aperture stop is disposed between two lenses included in the middle group,
   wherein the first focus lens unit is a second lens unit that is disposed closest to the object side in the middle unit,
   wherein the second lens unit includes a positive lens, and
   wherein following conditional expressions are satisfied:

$$-7.00 < f/fn < -1.78$$

$$1.10 < |fr/fn| < 5.50$$

$$10 < vd2p < 23$$

where f represents a focal length of the optical system, fn represents a focal length of the final lens unit, fr represents a focal length of the second focus lens unit, and vd2p represents an Abbe number with respect to a d-line of a material of the positive lens included in the second lens unit.

* * * * *